United States Patent [19]
Catlett et al.

[11] Patent Number: 5,671,333
[45] Date of Patent: Sep. 23, 1997

[54] TRAINING APPARATUS AND METHOD

[75] Inventors: Jason A. Catlett, Green Brook; William Arthur Gale, Maplewood; David Dolan Lewis, Summit, all of N.J.

[73] Assignee: Lucent Technologies Inc., Murray Hill, N.J.

[21] Appl. No.: 224,599

[22] Filed: Apr. 7, 1994

[51] Int. Cl.$^6$ .............................. G06E 1/00; G06E 3/00; G06F 15/18
[52] U.S. Cl. .................. 395/20; 395/21; 395/23
[58] Field of Search ................ 395/11, 20–23, 395/10, 25, 27; 382/155–163

[56] References Cited

U.S. PATENT DOCUMENTS 5,251,131  10/1993  Masand et al. ............... 364/419.08
5,402,519   3/1995  Inoue et al. ................. 395/22

OTHER PUBLICATIONS

Register, Michael S. and Narasimhan Kannan, "A Hybrid Architecture for Text Classification" Proc. of the 1992 IEEE Int. Conf. on Tools with AI. Nov. 1992.

DeStefano, Joseph J. "Logistic Regression and the Boltzmann Machine", Neural Networks 1990 IEEE Intl. Conf.

D.J.C. MacKay, "The Evidence Framework Applied to Classification Networks", *Neural Computation*, vol. 4, pp. 720–736 (1992).

J-N. Hwang, J.J. Choi, S. Oh, R. Marks, II, "Query–Based Learning Applied to Partially Trained Multilayer Perceptrons", *IEEE Transactions on Neural Networks*, vol. 2, No. 1, pp. 131–136, Jan. 1991.

L. Atlas, D. Cohn, R. Ladner, "Training Connectionist Networks with Queries and Selective Sampling", *Advances in Neural Information Processing Systems* 2, Ed. D.S. Touretzky, pp. 566–573, 1990.

Y. Freund, H.S. Seung, E. Shamir, N. Tishby, "Information, Prediction and Query by Committee", *Advances in Neural Information Processing Systems* 5, pp. 483–490, 1992.

W.A. Gale, K.W. Church, D. Yarowsky, "A Method for Disambiguating Word Series in a Large Corpus", *Computers and the Humanities*, vol. 26, pp. 415–439, 1993.

*Primary Examiner*—Tariq R. Hafiz
*Attorney, Agent, or Firm*—G. E. Nelson

[57] ABSTRACT

Apparatus and methods for training classifiers. The apparatus includes a degree of certainty classifier which classifies examples in categories and indicates a degree of certainty regarding the classification and an annotating classifier which receives classified examples with a low degree of certainty from the degree of certainty classifier and annotates them to indicate whether their classifications are correct. The annotated examples are then used to train another classifier. In one version of the invention, the other classifier is a new version of the degree of certainty classifier, and training continues until the degree of certainty classifier has satisfactory performance. The degree of certainty classifier of the embodiment is a probabilistic binary classifier which is trained using relevance feedback. The annotating classifier may include an interactive interface which permits a human user of the system to examine an example and indicate whether it was properly classified.

15 Claims, 2 Drawing Sheets

TRAINING APPARATUS AND METHOD

BACKGROUND OF THE INVENTION

1. Field of the Invention

The amount and variety of data stored online is growing at a rapid rate. This is particularly true for natural language text in its many forms (news articles, memos, electronic mail, repair reports, etc.). While the potential benefits of computer access to this data are huge, they cannot be realized unless the data is converted into information. An example of converting data to information is classifying the data into categories. For instance, stories on a newswire which are received by a business are useful to the business only if they are routed to the proper people within the business. Traditionally, this has been done by humans who read the stories, decide on the categories to which the story belongs, and then route each story to the users who have expressed interest in one of the categories assigned to it. As the amount of data has increased, manual data interpretation has become more and more impractical.

The problem of converting data to information exists for all kinds of data, and is particularly pressing with regard to text. Converting data to information in this case means reducing the infinite variety of possible natural language expressions to a limited set of possible interpretations. These interpretations can be as simple as labels indicating which of several meaningful categories a text belongs to, or as complex as parse tree, database records containing information extracted from text, or expressions in knowledge representations languages. Similar forms of interpretation are necessary for many other forms of data as well.

One approach to reducing the expense of interpretation is to use a data interpreter, that is a computer system which, given a data portion, can automatically produce an interpretation. A simple form of data interpreter is a classifier, that is a computer system that can decide which of several categories a data portion belongs to. In order to work, data interpreters require substantial knowledge about the structure of the data. For instance, for textual data extensive knowledge about human language and the ways in which human language can encode information is necessary. Building this knowledge into a data interpreter by hand is difficult and time consuming, due both to the amount of necessary knowledge and the difficulty of anticipating all the ways in which the data can encode information.

For this reason, a variety of machine learning techniques have been developed to automatically acquire interpretation knowledge from data which has been annotated with full or partial interpretations. This process of automatic knowledge acquisition is termed training. For instance, systems for sorting documents into categories have been trained from examples of documents manually annotated with their correct category. The training process examines the annotated documents to estimate the probabilities that certain words will or will not occur in documents belonging to a particular category. These probabilities can then be used in assigning documents to categories. As another example, experimental systems for diagnosing illnesses have been trained from patient records manually annotated with an expert physician's diagnosis. The training procedure discovers statistical or causal relationships between combinations of symptoms and associated diseases.

In general, the more data which can be annotated, the more accurate the training, and thus the better the interpreter. This has led organizations to devote substantial resources to creating large masses of annotated data for training purposes (see Mitchell P. Marcus, Beatrice Santorini, and Mary Ann Marcinkiewicz. Building a Large Annotated Corpus of English: The Penn Treebank, *Computational Linguistics*, vol. 19, no. 2, June, 1993, pp. 313–330).

Even large organizations cannot annotate all the data they have, however. Further, each new interpretation system requires training from data with a new kind of annotation. So it is almost always the case there is far more data than can be practically annotated, whether the teacher who does the annotation is a person or persons, or whether it is a computer system. (Even if there is already a computer system which is a good interpreter of the data, it may be desired to learn knowledge which enables a better interpreter, for instance one which is faster.)

2. Description of the Prior Art

There have been various attempts to reduce the amount of annotation required for training, particularly in the context of training classifiers. One approach is to train the classifier using a machine learning algorithm that makes membership queries (see Angluin, D. Queries and concept learning. *Machine Learning*, 2:319–342, 1988). In this approach, the learning algorithm creates an artificial data portion which the learning algorithm has determined cannot be reliably classified given the present state of training. The algorithm asks the teacher to annotate this artificial data portion, and the annotated data portion can be added to the rest of the annotated data to improve training. The problem with this approach is that artificially generated data may not make sense to the teacher, for instance if the data portion is supposed to be an expression in a human language.

A variety of related techniques from statistics, including stochastic approximation (see Yakowitz, S. and Lugosi, E. Random search in the presence of noise with application to machine learning. *SIAM Journal on Scientific and Statistical Computing*, 11(4):702–712, July 1990) and importance sampling (see Runnalls, A. Adaptive importance sampling for bayesian networks applied to filtering problems. In D. J. Hand, editor, *Artificial Intelligence Frontiers in Statistics: AI and Statistics III*, pages 90–105. Chapman & Hall, London, 1993) are similar to membership querying and suffer from the same problem. Approaches based on generating artificial annotated data by means of a distortion model also fail in the same circumstances.

Another approach to this problem is to treat it as one of choosing a sample, i.e. a subset of the data which will be presented for annotation. Sampling approaches must deal with the problem that particular annotations of interest are often very infrequent. Suppose only 1 in 1000 data portions should have annotation X, and only 500 portions can be affordably annotated. Using random sampling to choose which portions to annotated will usually result in no portions with annotation X. Thus little knowledge could be acquired about how to recognize X's.

Stratified sampling (see Cochran, W. *Sampling Techniques*. John Wiley & Sons, New York, 3rd edition, 1977) is the usual approach to addressing low frequency of certain annotations. The space of all possible data items is conceptually divided into strata, i.e. groups, based on some observable characteristics of the data. Sampling is then done separately from each stratum, with more data items taken from strata where the annotations are expected to be most uncertain or variable. While this approach works well when appropriate strata are obvious or are a matter of convention (as in public opinion research), the approach breaks down for many real world data sets, when the number of possible stratifications is huge and the appropriate choice of them very unclear. This is true, for instance, when the data items are natural language text.

Recently, however, a new approach to the annotation problem has emerged which can be thought of as a combination of stratified sampling and membership querying. These methods define strata directly in terms of the uncertainty of the unknown annotation, and then sample only from strata that are sufficiently uncertain. We call this approach uncertainty sampling. An important characteristic of uncertainty methods is that they operate iteratively. That is, once data whose interpretation is uncertain has been annotated, the annotated data is used to reduce the uncertainty of the interpretation of other data.

Several methods have been proposed for estimating the uncertainty of the unknown annotation (see Atlas, L., Cohn, D., et al. Training connectionist networks with queries and selective sampling. In David S. Touretzky, editor, *Advances in Neural Information Processing Systems* 2, pages 566–573. Morgan Kaufmann, San Mateo, Calif., 1990, and Cohn, D., et al. Improving generalization with self-directed learning, 1992. To appear in *Machine Learning*). In the technique proposed by Cohn, the interpreters are again classifiers.

Two neural net classifiers are trained from the available annotated data. The first classifier is intended to be an approximation to the most general classifier consistent with the training data. It is produced by giving the neural net training algorithm all the annotated examples, plus a large number of random examples temporarily annotated as being positive examples. The second classifier is intended to be an approximation to the most specific classifier consistent with the training data. It is produced by giving the neural net training algorithm all the annotated examples, plus a large number of random examples temporarily annotated as being negative examples. Cohn does not specify how many temporarily annotated examples are needed in either case, except to say that the number is large. It seems likely that the number would have to increase sharply with the number of features used to represent the data items. The temporarily labeled items are meant to provide coverage of entire space outside of the labeled data, and this space grows exponentially with the number of features.

Cohn's two classifiers are applied to unannotated data items and those items on which the classifiers disagree are presented to a teacher for annotation. The annotated data is then updated, new versions of the classifiers are trained and more unannotated data is tested.

A related approach is the query by committee algorithm (see Seung, H., et al. Query by committee. In *Proceedings of the Fifth Annual ACM Workshop on Computational Learning Theory*, pages 287–294, 1992 and Freund, Y., et al. Information, prediction, and query by committee. In *Advances in Neural Informations Processing Systems* 5, San Mateo, Calif., 1992. Morgan Kaufmann). Query by committee randomly selects two classifiers consistent with the already annotated data for each unannotated data item. These two classifiers are applied to the corresponding unannotated data item, and if the classifiers disagree, the annotation of the item is considered to be uncertain and the teacher is asked to annotate it. Again, this process is iterative, with the annotations of previous items affecting which classifiers will be selected and which items found uncertain in the future. Only the theoretical aspects of the algorithm are presented—Seung, et al do not present a method for actually implementing the choice of classifiers.

In a third approach, MacKay suggests choosing data items to be annotated based on a mean marginal information gain function (see MacKay, D. The evidence framework applied to classification networks. *Neural Computation*, 4(5) :720–736, 1992). This function requires extensive computational analysis of the current classifier even to compute approximately, and also requires information about the distribution of data to which the final classifier will be applied. MacKay presents experimental results suggesting that this approach will only work when the model being fit is well matched to the actual regularity in the data. He also does not describe an explicit annotation algorithm based on mean marginal information gain.

None of the above methods provide a general solution to the problem of selecting data for annotation. Query by committee is not computationally effective and MacKay's algorithm, while of theoretical interest, has not been shown to work in practice. Cohn's method is the closest to practical, but its expense is considerable, due to the need to train two classifiers on large amounts of temporarily labeled data. Cohn points out other limitations of his method as well. In addition, none of these methods have been implemented in a fashion suitable for working with large real world data collections, such as text databases, where data items are characterized by very large numbers of features (e.g. tens of thousands of distinct words).

MacKay and Cohn both warn explicitly against an alternative strategy, which is to select data near the decision boundary of a single classifier produced by a machine learning algorithm applied to the training data. They point out several theoretical failings of using a single classifier, including underestimation of true uncertainty, and biases caused by nonrepresentative classifiers.

There are several reasons to dispute the reasoning of MacKay and Cohn, however. First, the experiments of MacKay and Cohn attempted to learn deterministic functions of small numbers of features from noise-free data. Most real data interpretation problems are characterized by large numbers of features, considerable noise in the data, and non-deterministic (statistical) relationships between data and interpretation. All these characteristics work to mitigate the theoretical problems raised by MacKay and Cohn.

Second, single classifiers have been successfully used for the related tasks of generating membership queries (see Hwang, J., et al. Query-based learning applied to partially trained multilayer perceptrons. *IEEE Transactions on Neural Networks*, 2(1):131–136, January 1991) and reducing the size of already annotated data sets (see Davis, D. and Hwang, J. Attentional focus training by boundary region data selection. In *International Joint Conference on Neural Networks*, pages I-676 to I-681, Baltimore, Md., Jun. 7–11 1992, and Plutowski, M. and White, H. Selecting concise training sets from clean data. *IEEE Transactions on Neural Networks*, 4(2):305–318, March 1993).

Third, there is one application where a single classifier has been used for selecting from unlabeled data, though not by an uncertainty sampling method. This is relevance feedback in text retrieval systems (see Salton, G. *Automatic Text Processing: The Transformation, Analysis, and Retrieval of Information by Computer.* Addison-Wesley, Reading, Mass., 1989). A text retrieval system using relevance feedback operates as follows. The user issues an initial query to the system, which is converted internally to a statistical classifier. The classifier is used to estimate which documents are most likely to be relevant to the user, and those documents are displayed to the user. The user then annotates the retrieved documents to indicate which are relevant and which are not. These annotated documents are used, along with the original query, to train a new classifier. This new classifier is used to again select the documents most likely to be relevant to the user, and the process is repeated as many times as desired by the user.

Relevance feedback has been found to be effective in increasing the performance of text retrieval systems, and has also been used in selecting training data in word sense disambiguation (see Gale, W., et al. A method for disambiguating word senses in a large corpus. *Computers and the Humanities*, 26:415–439, 1993). It is not a general solution to the selection problem, however. Relevance feedback systems focus in on a small portion of the space of possible data items with a particular annotation, rather than getting examples of the full range of data items with that annotation and without that annotation. In particular, they operate poorly when there are large numbers of redundant items with the same annotation. Also, they are only applicable to binary annotations.

What is needed, and what is provided by the present invention, is a method that selects data items to annotate which leads to increased effectiveness of learned knowledge, and which is efficient, usable with arbitrary real world data sets, is implementable on a digital computer, and does not suffer from the problems of the above described methods.

SUMMARY OF THE INVENTION

The invention solves the above problems by taking advantage of the fact that certain kinds of interpreters can specify the degree of certainty of their interpretations. The technique of the invention is iterative, and works as follows: the system includes a first interpreter which is one of the above interpreters and has been previously trained on training data; a set of examples is presented to the interpreter and the interpreter interprets them. When the interpretation given an example has a low degree of certainty, the interpreter passes the example to a second interpreter, termed herein the teacher, which annotates the example. The annotated example is then added to the training data. After the interpreter has worked through all of the examples as just described, a new interpreter is created using the training data with the additional annotated examples and run on the original examples as just described. The iterations continue until an interpreter with the desired degree of accuracy is obtained.

In another aspect, the invention is a general technique for producing training information. The annotated examples produced by the teacher represent training information which can be used to train any kind of interpreter, including ones which use principles of interpretation different from those used by the first interpreter.

Other objects and advantages of the apparatus and methods disclosed herein will be apparent to those of ordinary skill in the art upon perusal of the following Drawing and Detailed Description, wherein:

Figure 1:
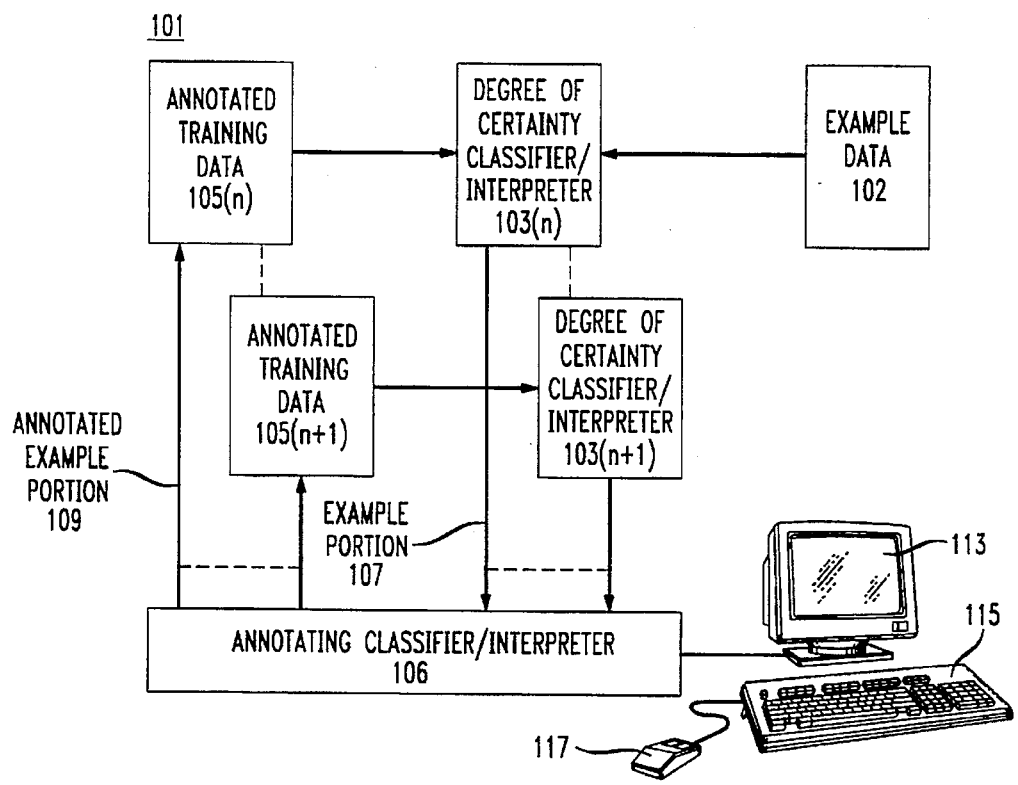
FIG. 1 is an overview of apparatus for making an interpreter according to the principles of the invention.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description first presents an overview of apparatus for producing a classifier according to the principles of the invention and then describes the apparatus in detail. Finally, another apparatus for producing a classifier according to the principles of the invention is described in overview.

Apparatus for Making a Classifier: FIG. 1

FIG. 1 shows apparatus 101 for making a classifier. The apparatus includes example data 102, degree of certainty classifier 103, teaching classifier 106, and annotated training data 105. Data 102 contains the data portions which the classifier produced by apparatus 101 must classify. The example data is used to train the classifier so that it can successfully classify other data having the same characteristics as the example data. Degree of certainty classifier 103 is a classifier which not only classifies the data, but also produces a certainty value which indicates how certain degree of certainty classifier 103 is of its classification.

Annotating classifier 106 is a classifier which can take data portions from example data 102 and annotate them to indicate how they are to be classified. The annotation may be a simple indication of the correct classification of the data portion or it may be a more complex value which indicates the degree of closeness of the data portion to the proper classification. In any case, the annotation can be represented as an array of one or more bits. For instance, if there are 8 classifications, the array might contain 3 bits.

Annotating classifier 106 may be another automatic classifier, or it may include interactions with a human being. In the latter case, classifier 106 might operate interactively with display 113, keyboard 115, and mouse 117. In such an embodiment, annotating classifier 106 would display a data portion 107 on display 113 and the human being would indicate the annotation by input from keyboard 115 or using mouse 117 to select an annotation from a menu.

Alternatively, if annotating classifier 106 is an automatic classifier, it may receive data portions 107 as data structures and output the annotations as data structures as well. Depending on the implementation, the annotation may also include the classification provided by classifier 103. Annotated training data 105, finally, is a collection of data portions which have been annotated, either by annotating classifier 106 or other annotating agents.

Operation of apparatus 101 is iterative. For a given iteration, a degree of certainty classifier 103(n) has been trained on the annotated training data 105(n). Degree of certainty classifier 103(n) then classifies data portions from example data 102. For each data portion in example data 102, degree of certainty classifier 103 determines the classification of the data portion and the certainty value for the classification. If the certainty value represents a low degree of certainty for a data portion, degree of certainty classifier 103(n) provides the data portion 107 to annotating classifier 106. Annotating classifier 106 then annotates the data portion 107 and provides annotated data portion 109 to annotated training data 105.

Thus, after degree of certainty classifier 103(n) has classified all of the data portions in example data 102, a number of annotated data portions 109 have been added to annotated training data 105. The previous annotated training data 105(n) and the new annotated data portions 109 make up annotated training data 105(n+1). Training data 105(n+1) is then used to produce a new degree of certainty classifier 103(n+1). Iterations continue in this fashion until a degree of certainty classifier 103(n+x) is produced which is accurate enough for the purpose at hand. The iterations may cease, for example, because degree of certainty classifier 103(n+x) is correctly classifying all of the data portions in example data 102 or because it has reached a point where repeated iterations can no longer be justified.

Efficiency of operation of apparatus 101 is increased if some annotated training data 105 is provided prior to the first iteration. Experience has shown that for every bit $C_i$ in the bit array used for the annotations there should be data portions such that there are at least three annotations in the initial training data 105 with $C_i=1$ and at least three with $C_i=0$. Thus, if the annotation is a single bit indicating whether or not a data portion belongs to a category of interest, there should be at least 6 data portions in training data 105, three that belong to the category and three that do not. This property of the initial training data has been found to help avoid a long period where poor estimates of uncertainty are produced.

It should be pointed out here that while the annotated data portions 109 produced by annotating classifier 106 are used in apparatus 101 to train the next degree of certainty classifier 103, they could just as well be used to train another classifier altogether. Annotated data portions 109 thus represent generally useful training data, and apparatus can be seen not only as apparatus for producing a classifier 103, but also as apparatus for producing training data. The training data produced by apparatus 101 is particularly effective. The reason for this is that degree of certainty classifier 103(n) effectively filters example data 102 for those data portions 107 which are most useful in training.

Figure 2:
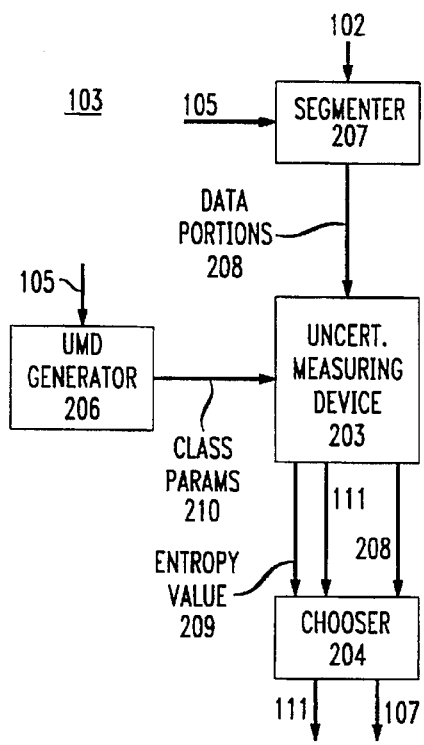
FIG. 2 is a block diagram of apparatus for selecting interpretations according to the degree of certainty.

Details of Degree of Certainty Classifier 103: FIG. 2

FIG. 2 shows details of degree of certainty classifier 103. Components of classifier 103 are segmenter 207, which divides examples 102 into portions 208 suitable for interpretation by uncertainty measuring device (UMD) 203, uncertainty measuring device (UMD) 203, which assigns a classification 111 and an entropy value 209 indicating the degree of uncertainty to each portion 208, and chooser 204, which determines which of the portions 208 are to be provided to annotation classifier 106. Uncertainty measuring device 203 is provided with classification parameters 210 by uncertainty measuring device generator 206. UMD generator 206 uses annotated training data 105 to compute parameters 210.

Operation is as follows: Example data 102 is input to segmenter 207. Segmenter 207 breaks the data apart into portions 208 suitable for input to UMD 203. For example, if example data 102 is the output of a newswire, segmenter 207 may break it into individual news stories. Segmenter 207 also checks each portion 208 against the annotated training data 105 to see whether the data portion is included in the annotated training data 105. If it is not, segmenter 207 passes data portion 208 to UMD 203.

UMD 203 classifies each unannotated data portion 208 according to parameters 210 and also computes an estimate 209 of the entropy of the classification to that data portion. The entropy is a numeric measure of the uncertainty as to the correct value for classification 111 for that data portion 208. The greater the uncertainty, the larger the entropy value 209.

The data portions 208, entropy values 209, and perhaps also classifications 111 are output to a chooser 204. Chooser 204 chooses a subset of data portions to be the output of apparatus 103 on the basis of entropy value 209. In a preferred embodiment chooser 204 chooses the single data portion with the highest entropy value 209 as the output of degree of certainty classifier 103. Other strategies may be useful in certain circumstances. For instance, it may be convenient to display several data portions 209 with high entropy values 209 and let a human interacting with annotating classifier 106 judge them all at once. When the number of possible classifications is small, it is also useful if chooser 204 picks the portion 208 with the highest entropy value 209 for each classification, rather than simply the portions 208 with the highest entropy values 209, regardless of classification.

Of course, other measurements besides entropy of the quality of data portions for training could be used in selecting data portions. For instance, we could treat probability estimates themselves as the desired output of the classifier, and use an estimate of the variance of these probability estimates as a measure of quality. If a classifier based on fuzzy logic were used, the degree of membership produced by the classifier could be used. If the classifier is able to determine the class of a data portion by examining only some of its bits, then one measure of quality is how many bits of a data portion must be considered before the data portion can be classified: the more bits which must be considered, the more useful the data portion is for further training.

Figure 3:
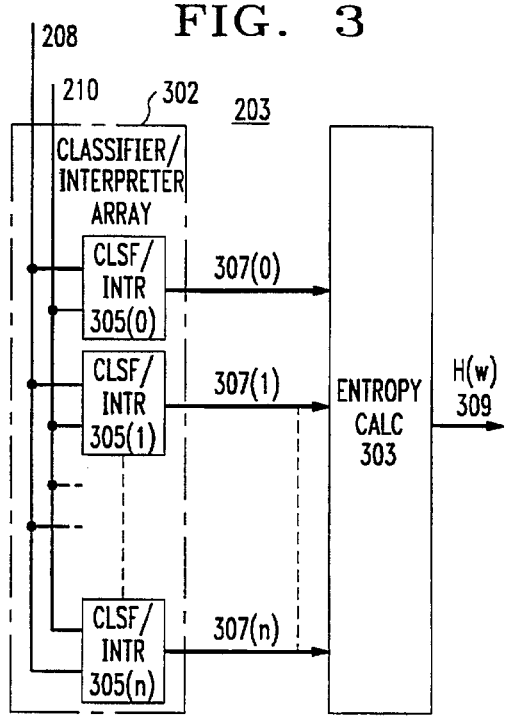
FIG. 3 is apparatus for measuring the degree of uncertainty.

Implementation of Uncertainty Measuring Device 203: FIG. 3

In a preferred embodiment, UMD 203 is implemented as shown in FIG. 3. There are two main components: classifier array 302 and entropy calculator 303. Classifier array 302 contains one probabilistic binary classifier 305 for each bit in the array of bits making up an annotation. Classifiers 305 are described in more detail below. In operation, each probabilistic binary classifier 305(i) receives parameters 210(i) from UMD generator 206 as well as the text portion 208 to be classified. The ith probabilistic classifier 305(i), outputs an estimate of $P(C_i=1|W)$, the probability that the ith bit of the data portion's correct annotation is 1. The output of classifier array 302 is the set of values $P(C_i=1|W)$ for $i=1 \ldots n$.

Given estimates of $P(C_i=1|W)$, one measure of the uncertainty as to the complete n-bit annotation $C=(C_1, C_2, \ldots, C_n)$ of a given data portion 208(W) under the assumption that all bits are independent is the entropy $H(W)$ of the joint probability distribution given by $P(C_1|W), \ldots, P(C_n|W)$. (Entropy is described in Ingels, F. *Information and Coding Theory*. Intext, Scranton, 1971.) The entropy $H(W)$ is equal to:

$$\sum_{Z_1=0}^{1} \cdots \sum_{Z_n=0}^{1} \left( \left( \prod_{i=1}^{n} P(C_i=Z_i|W) \right) \times \log \left( \prod_{i=1}^{n} P(C_i=Z_i|W) \right) \right) \quad (1)$$

where the logarithm is to base 2. By the rules of statistics, $H(W)$ is therefore also equal to the more easily computed expression:

$$\sum_{i=1}^{n} (P(C_i=1|W)\log P(C_i=1|W) + P(C_i=0|W)\log P(C_i=0|W)) \quad (2)$$

The calculation of $H(W)$ for data portion 208(W) is implemented in an entropy calculating program 303 whose input is the set of estimates of $P(C_i=1|W)$ output by classifier array 302, and whose output is H(W) 309, an estimate of the entropy associated with the annotation of data portion 208 (W). The value H(W) is highest when the annotation of data portion 208(W) is the most uncertain.

Figure 4:
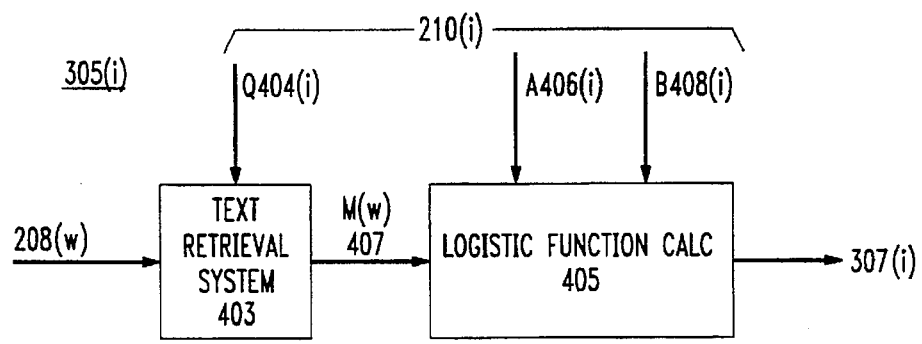
FIG. 4 is a detail of a probabilistic classifier used to measure the degree of uncertainty.

Apparatus and Operation of A Probabilistic Binary Classifier 305: FIG. 4

FIG. 4 shows details of a probabilistic classifier 305(i) in a preferred embodiment. UMD generator 206 provides a set of parameters 210(i) for each probabilistic classifier 305(i). There are three such parameters: Q 404(i), A 406(i), and B 408(i). Q 404(i) is a query which is presented to text portion 208(W) to determine a class membership score M(W) 407 which reflects the probability that text portion 208(W) has a given classification. The query consists of terms which are typical for the given classification and numeric weights indicating the importance of the term for the classification. Class membership score M(W) 407 is determined from the query terms which are present in text portion 208(W) and their weights. A 406(i) and B 408(i), are logistic parameters used to put M(W) 407 into the proper form for presentation to entropy calculator 303. How the parameters are produced by UMD generator 206 will be explained in detail below.

Probabilistic classifier 305(i) is implemented by providing parameter Q 404(i) and a data portion 208(W) as inputs to statistical text retrieval system 403, which produces a class membership score M(W) 407 for the data portion 208(W) and then using M(W) 407 and the parameters A 406(i) and B 408(i) in logistic function calculator 405. Logistic function calculator 405 is a program which implements the mathematical function:

$$\frac{e^{A_i + B_i \times M(W)}}{1 + e^{A_i + B_i \times M(W)}} \quad (3)$$

where e is the constant which is the base of natural logarithms. The output of the logistic function calculator 405 is the estimate of $P(C_i=1|W)$ 307 (i) output by probabilistic classifier 305(i). Of course, all of the probabilistic classifiers 305 use the same text retrieval system 403 and logistic function calculator 405. It should also be noted here that statistical text retrieval system 403 can process both textual and nontextual data. For instance, numeric data values can be converted to values of nominal variables by standard techniques (see Chatfield, C., *Problem Solving: A Statistician's Guide*, Chapman and Hall, London, 1988) and the names of those nominal variable values can then be treated as words by the text retrieval system.

Figure 5:
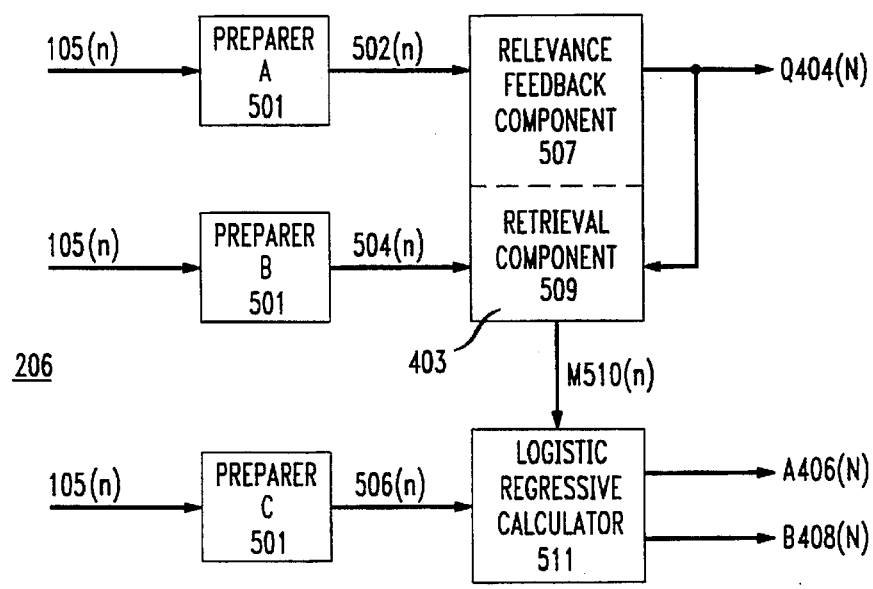
FIG. 5 is apparatus for training the probabilistic classifier.

Training Probabilistic Binary Classifier 305(i): FIG. 5

The accuracy of the estimate of $P(C_i=1|W)$ produced by probabilistic classifier 305(i) depends on UMD generator 206's computation of the parameters from the training data. It is this computation which "trains" probabilistic binary classifier 305(i) by "training" its parameters.

The training of query Q 404(i) uses a relevance feedback capability of the statistical text retrieval system 403. Relevance feedback is the automated construction of a text retrieval query from portions of text that are marked as being relevant (members of a class of texts of interest), and portions of text that are marked as being nonrelevant (not members of a class of texts of interest). In the present case, these portions of text are taken from the annotated training data 105. Relevance feedback can also take into account an initial suggested query provided along with the relevant and nonrelevant texts. The output query formed by relevance feedback consists of words extracted from the relevant and nonrelevant example portions 109 and from the initial query, along with numeric weights indicating the importance of those words in identifying texts which are relevant. The weights may be computed using a variety of methods, for instance by making use of estimates of the probability that a word occurs in relevant documents and the probability it occurs in nonrelevant documents.

The construction of text retrieval systems implementing relevance feedback is disclosed by Gerard Salton in *Automatic Text Processing: The Transformation, Analysis, and Retrieval of Information by Computer*, Addison-Wesley Publishing, 1989; or by Donna Harman in *Information Retrieval: Data Structures and Algorithms*, Prentice-Hall Publishing, 1992. Text retrieval systems which can perform relevance feedback are also commercially available. One example is Personal Librarian from Personal Library Software of Rockville, Md.

Details of UMD generator 206 are shown in FIG. 5. Preparer A 501 takes annotated data portions 105(n) as input and produces marked data portions 502(n) as output. Preparer A 501 removes the annotations from the annotated data portions 105(n), but before doing so examines bit $C_i$ of the annotation of each data portion. If bit $C_i$ is equal to 1, that data portion is, in a fashion appropriate to the text retrieval system, marked as being relevant. If bit $C_i$ is 0, that data portion is, in a fashion appropriate to the text retrieval system, marked as being nonrelevant.

Marked data portions 502(n) produced by Preparer A 501 are input to relevance feedback component 507 of statistical text retrieval system 403 along with appropriate commands to operate relevance feedback component 507. Relevance feedback component 507 outputs query Q 404(n) in response to marked data portions 502(n).

Preparer B 503 then takes annotated data portions 105(n) as input, removes the annotations from annotated data portions 105(n), and outputs the resulting unannotated data portions 504(n) to retrieval component 509 of text retrieval system 403. Query Q 404(n) is also input to retrieval component 509, along with appropriate commands to cause text retrieval system 403 to operate in retrieval mode. Text retrieval system 408 uses query Q 404 (n) and unannotated data portions 504(n) to compute a set of class membership scores M 510(n) which contains one class membership score M(W, n) for each data portion W in annotated data portions 105.

Because relevance feedback was used to produce Q 404(n) the class membership score M(W, n) of each data portion W will be statistically correlated with $P(C_i=1|W)$. The transformation of each class membership score M(W,n) into an actual estimate of $P(C_i=1|W)$ is done in the preferred embodiment by means of logistic parameters A 406(n) and B 408(n).

The logistic parameters A 406(n) and B 408(n) are produced using logistic regression software 511, as follows. Preparer C 505 receives annotated data portions 105(n) and produces labeled data portions 506(n). Preparer C 505 removes the annotations from annotated data portions 105 (n), but before doing so, preparer C 505 examines bit $C_i$ of each annotation. If bit $C_i$ of the annotation is equal to 1, the data portion is, in a fashion appropriate to the logistic regression software, labeled with the response value 1. If bit $C_i$ is 0, the data portion is, in a fashion appropriate to the text retrieval system, labeled with the response value 0.

The labeled data portions 506(n) output by Preparer C 505 are input to logistic regression calculator 511 along with class membership scores M(n) 510. The output of the logistic regression software 506 is the pair of parameters A 406(n) and B 406(n) derived from the labeled data portions 506(n) and the class membership scores M 510(n). The logistic regression software will choose parameters A 406(n) and B 406(n) so that a logistic function with those parameters will, when a class membership score M(W) for any data portion W is input, produce an output close in value to the correct response value (0 or 1). Such an output serves as a good estimate of the probability $P(C_i=1|W)$. While the logistic regression computation in the preferred embodiment uses a binary model, non-binary models may be used as well.

Techniques for performing logistic regression are well known in the art. For details, see Agresti, A., *Categorical Data Analysis*, John Wiley, New York, 1990. and McCullagh, P. and Nelder, J., *Generalized Linear Models*, Chapman & Hall, London, 2nd edition, 1989. Logistic regression is also a capability in commercially available statistics packages such as SPSS from SPSS, Inc. of Chicago, Ill.

Figure 6:
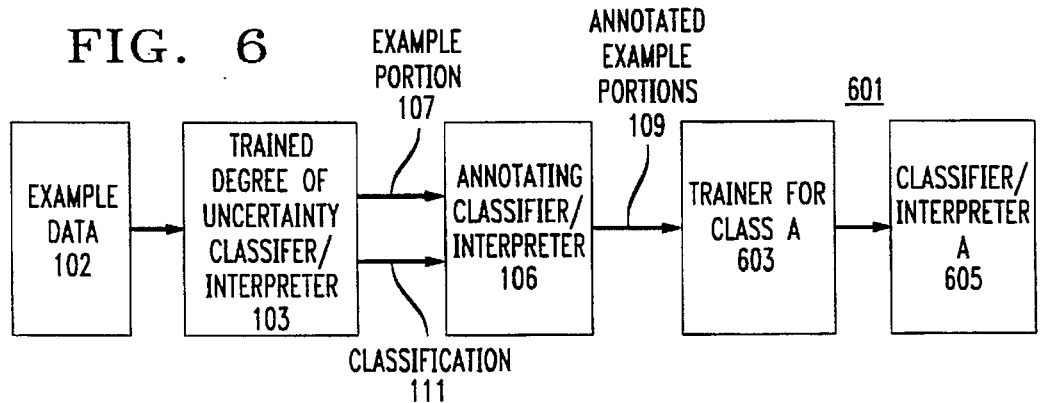
FIG. 6 is a block diagram of second apparatus for making an interpreter according to the principles of the invention.

Using Apparatus 101 to Produce Training Data: FIG. 6

As previously pointed out, apparatus 101 is in one aspect apparatus for producing training data 105. In apparatus 101, the training data 105 is used to train a sequence of degree of uncertainty classifiers 103. When the desired degree of accuracy is reached, the last classifier 103 is run on actual data, and example portions 107 and classifications 111 are output by classifier 103 to whatever application requires the information. In this case, classifier 103(i) which produced the example portions 107 and classifications 111 annotated by annotation classifier 106, and classifier 103(j) which will be used to do the actual classification are of the same type, and we say that classifier 103 is trained by homogeneous uncertainty sampling. However, it is not necessary that classifier 103 which is providing the example portions 107 and classifications 111 to annotation classifier 106 are of the same type as classifier 103 which is trained with training data 105. When they are not of the same type, we say that training is by heterogeneous uncertainty sampling.

Homogeneous uncertainty sampling usually produces more effective data interpreters than heterogeneous uncertainty sampling. However, training using heterogeneous uncertainty sampling is sometimes necessary. For instance, the final interpreter and training method desired in application may be too inefficient to use as degree of certainty classifier 103, or the final interpreter may not produce output in a form from which uncertainty can be estimated.

FIG. 6 shows how an already trained degree of certainty classifier 103 and an annotating classifier 106 can be used to provide annotated example portions 109 for use by a trainer 603 to train classifier A 605. Operation of apparatus 601 is immediately apparent from FIG. 6: example data 102 is presented to trained degree of certainty classifier 103, which outputs example portions 107 and their classifications 111 when the classifications have a low degree of certainty. Annotating classifier 106 then annotates the example portions to indicate whether the classification 111 provided by classifier 103 was correct and provides the annotated example portions 109 to trainer 603, which uses them to train classifier A 605. Classifier A 605 may of course be of a different type from classifier 103.

Conclusion

The foregoing Detailed Description has disclosed to those skilled in the art how to make and use apparatus for training data interpreters which reduces the time and effort required for training. While the embodiment disclosed herein is the best mode presently known to the inventors for implementing their invention, it will be immediately apparent to those skilled in the art that the principles of the invention may be implemented using any technique by which a subset of the example data which is particularly useful for training can be determined. Where annotating classifier 106 involves human participation, the apparatus can be implemented using any kind of interface which presents example portions to the human user in a fashion which permits quick and easy annotation. Further, as was apparent from the Detailed Description, many variations are possible even in the techniques used in the disclosed embodiment.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted with the full breadth to which they are entitled under the patent laws.

What is claimed is:

1. An apparatus for interpreting data, comprising:

a current first classifier operative to interpret a plurality of actual examples of the data and to output an interpretation of each interpreted example and a certainty value associated with each interpretation wherein the current first classifier comprises a chooser operative to discriminate between certain ones of the outputted interpretations having respective high certainty values and uncertain ones of the outputted interpretations having respective low certainty values and to select and output each of the actual examples associated with a respective uncertain one of the interpretations;

a second classifier operative to annotate each of the interpreted examples associated with the selected uncertain ones of the interpretations and to output a preferred interpretation for each interpreted example associated with the selected uncertain ones of the interpretations; and an uncertainty measuring device generator operative to produce a next first classifier by utilizing at least one annotated example and its associated preferred interpretation, the next first classifier capable of interpreting subsequent actual examples of the data more accurately than the current first classifier.

2. The apparatus set forth in claim 1 further comprising an uncertainty measuring device computes an estimate of the entropy of the classification to each unannotated data portion.

3. The apparatus set forth in claim 1, wherein:

said examples are divided into data portions by a segmenter.

4. An apparatus for interpreting data, comprising:

a first classifier operative to interpret a plurality of actual examples of the data and to output an interpretation of each interpreted example and a certainty value associated with each interpretation wherein the first classifier comprises a chooser operative to discriminate between certain ones of the outputted interpretations having respective high certainty values and uncertain ones of the outputted interpretations having respective low certainty values and to select and output each of the interpreted examples associated with a respective uncertain one of the interpretations;

a second classifier operative to annotate each of the interpreted examples associated with the selected uncertain ones of the interpretations and to output a preferred interpretation for each interpreted example associated with the selected uncertain ones of the interpretations; and an uncertainty measuring device generator operative to produce a next first classifier by using at least one annotated example and its associated preferred interpretation, the next first classifier capable of interpreting subsequent actual examples of the data more accurately than the first classifier.

5. The apparatus of claim 4 further comprising an uncertainty measuring device computes an estimate of the entropy of the classification to each unannotated data portion.

6. The apparatus of claim 4, wherein:

said examples are divided into data portions by a segmenter.

7. An apparatus for interpreting data, comprising:

a first classifier operative to interpret a plurality of actual examples of the data according to a first principle and to output an interpretation of each interpreted example and a certainty value associated with each interpretation wherein the first classifier comprises a chooser operative to discriminate between certain ones of the outputted interpretations having respective high certainty values and uncertain ones of the outputted interpretations having a low certainty values and to select and output each of the interpreted examples associated with a respective uncertain one of the interpretations;

a second classifier operative to annotate each of the interpreted examples associated with the selected uncertain ones of the interpretations and to output a preferred interpretation for each interpreted example associated with the selected uncertain ones of the interpretations; and an uncertainty measuring device generator operative to produce a third classifier by utilizing at least one annotated example and its associated preferred interpretation, the third classifier operative to interpret subsequent actual examples of the data according to a second principle different from the first principle.

8. The apparatus set forth in claim 1, claim 4 or claim 7 wherein, the data is text.

9. The apparatus set forth in claim 1, claim 4, or claim 7 wherein:

the data is text.

10. The apparatus set forth in claim 1, claim 4, or claim 7 wherein:

the second classifier includes interactive means for providing the example to a human judge and receiving the annotation from the judge.

11. The apparatus set forth in claim 1, claim 4 or claim 7 wherein:

the uncertainty measuring device generator includes means for using relevance feedback to produce the next first classifier.

12. The apparatus set forth in claim 1, claim 4 or claim 7 wherein:

the classifier classifies data into classes;

the uncertainty measuring device generator includes:

means for producing a class membership score for each annotated uncertain example, and means for using logistic regression to produce a parameter for each annotated uncertain example which modifies the class membership score to indicate a probability that the annotated uncertain example belongs to the class.

13. The apparatus of claim 7 further comprising an uncertainty measuring device computes an estimate of the entropy of the classification to each unannotated data portion.

14. The apparatus of claim 7, wherein:

said examples are divided into data portions by a segmenter.

15. The apparatus set forth in claim 1, claim 4 or claim 7, wherein each of the respective low certainty values is less than a lowest one of the respective high certainty values.

* * * * *